(12) United States Patent
Lee

(10) Patent No.: US 11,230,277 B2
(45) Date of Patent: Jan. 25, 2022

(54) AIR BLEEDING APPARATUS AND METHOD FOR ELECTRIC BRAKE SYSTEMS

(71) Applicant: HYUNDAI MOBIS Co., Ltd., Seoul (KR)

(72) Inventor: Jee Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 197 days.

(21) Appl. No.: 16/732,631

(22) Filed: Jan. 2, 2020

(65) Prior Publication Data
US 2020/0216055 A1    Jul. 9, 2020

(30) Foreign Application Priority Data

Jan. 3, 2019 (KR) .................. 10-2019-0000594

(51) Int. Cl.
*B60T 17/22* (2006.01)
*B60T 11/30* (2006.01)

(52) U.S. Cl.
CPC ............. *B60T 17/222* (2013.01); *B60T 11/30* (2013.01)

(58) Field of Classification Search
CPC ................................ B60T 17/222; B60T 11/30
See application file for complete search history.

(56) References Cited

U.S. PATENT DOCUMENTS

2015/0175145 A1* 6/2015 Nakata ................. B60T 11/16
188/352
2017/0282879 A1* 10/2017 Matsunaga ........... B60T 8/4081

FOREIGN PATENT DOCUMENTS

| CN | 108944876 B | * | 3/2021 | ............ B60T 13/745 |
| FR | 2972166 A1 | * | 9/2012 | ............ B60T 8/4077 |
| KR | 10-20020018791 | | 10/2002 | |
| WO | WO-2018224834 A1 | * | 12/2018 | ............. B60T 13/20 |

* cited by examiner

*Primary Examiner* — Melanie Torres Williams
(74) *Attorney, Agent, or Firm* — H.C. Park & Associates, PLC

(57) ABSTRACT

An air bleeding apparatus and method for electric brake systems. The air bleeding apparatus includes a piston position sensor configured to detect a position of a piston installed in a main master cylinder, a motor drive unit configured to drive a motor to move the piston, a motor speed detection unit configured to detect a speed of rotation of the motor, a brake pedal position sensor configured to detect a position of a brake pedal, and a control unit configured to, when entering an air bleeding mode, release a normally actuated valve and control the position of the piston by controlling the motor drive unit according to the position of the piston detected by the piston position sensor or the speed of rotation of the motor detected by the motor speed detection unit when it is determined that the brake pedal is pressed.

14 Claims, 5 Drawing Sheets

AIR BLEEDING APPARATUS AND METHOD FOR ELECTRIC BRAKE SYSTEMS

CROSS-REFERENCE TO RELATED APPLICATION

The present application claims priority under 35 U.S.C. § 119(a) to Korean Patent Application No. 10-2019-0000594, filed on Jan. 3, 2019 in the Korean Intellectual Property Office, which is incorporated herein by reference in its entirety.

BACKGROUND

1. Technical Field

Embodiments of the present disclosure relate to an air bleeding apparatus and method for electric brake systems, and more particularly, to an air bleeding apparatus and method for electric brake systems that remove bubbles generated in brake oil even when an electric brake system is powered.

2. Related Art

If an electric brake system is not electrically backed up, a control unit is operated to generate a pressure command for the application of pressure to a brake pedal so that a motor is driven to drive a piston by pressure control in response to the pressure command. This interferes with the transfer of oil and the electric brake system must therefore be maintained in the state of electrical backup during an air bleeding mode. In addition, work must be performed in the state of electrical backup to release the operation of a valve blocking the passage of a hydraulic modulator.

When a user presses the pedal in the state of electrical backup, the piston moves rearward toward the motor due to a difference in pressure between both chambers in an auxiliary master cylinder.

The piston is in its initial position (1.5 mm when the pedal is at a position of 0 mm) when the air bleeding mode begins, in which case if the pedal is repeatedly pressed while air bleeding is performed, the piston will collide at the position of 0 mm.

This collision of the piston to the initial position is repeated every time the brake pedal is pressed. The speed at which the piston collides is usually about 1,000 to 1,200 rpm. This level of speed may cause damage to the electric brake system, and even though the electric brake system is not actually damaged, the accumulated collision damage will act as a factor that degrades the performance of the electric brake system during actual driving in the future.

The related art of the present disclosure is disclosed in Korean Patent Application Publication No. 10-2002-0018791 (Mar. 9, 2002), entitled "AIR BLEEDING APPARATUS FOR VEHICLE BRAKE".

SUMMARY

Various embodiments are directed to an air bleeding apparatus and method for electric brake systems that prevent a collision of a piston in an air bleeding mode by controlling a motor to maintain the piston at a predetermined target position when entering the air bleeding mode.

In an embodiment, there is provided an air bleeding apparatus for electric brake systems that includes a piston position sensor configured to detect a position of a piston installed in a main master cylinder, a motor drive unit configured to drive a motor to move the piston, a motor speed detection unit configured to detect a speed of rotation of the motor, a brake pedal position sensor configured to detect a position of a brake pedal, and a control unit configured to, when entering an air bleeding mode, release an operation of a normally actuated valve and control the position of the piston by controlling the motor drive unit according to the position of the piston detected by the piston position sensor or the speed of rotation of the motor detected by the motor speed detection unit when it is determined that the brake pedal is pressed through the position of the brake pedal detected by the brake pedal position sensor.

The control unit may maintain the piston at a predetermined target position.

The normally actuated valve may be disposed upstream of a wheel cylinder to control a brake hydraulic pressure supplied to the wheel cylinder, and when entering the air bleeding mode, the control unit may release the normally actuated valve and check a zero position of the piston to move the piston to the target position according to the position of the piston based on the zero position of the piston.

The target position may be a position corresponding to half of the total displacement of the piston.

The control unit may increase a motor control current supplied to the motor.

When the position of the piston is out of a preset allowable variation in piston position, the control unit may increase and modulate a position control proportional gain of the motor control current.

When the speed of rotation of the motor is out of a preset allowable variation in motor speed of rotation, the control unit may increase and modulate a position control proportional gain of the motor control current.

In an embodiment, there is provided an air bleeding method for electric brake systems that includes determining, by a control unit, when entering an air bleeding mode, whether a brake pedal is pressed through a position of the brake pedal detected by a brake pedal position sensor, and controlling, by the control unit, when it is determined that the brake pedal is pressed, a motor drive unit according to a position of a piston detected by a piston position sensor or a speed of rotation of a motor detected by a motor speed detection unit to control the position of the piston.

In the controlling, by the control unit, when it is determined that the brake pedal is pressed, a motor drive unit, the control unit may maintain the piston at a predetermined target position.

The air bleeding method may further include, when entering the air bleeding mode, the control unit releasing an operation of a normally actuated valve and checking a zero position of the piston to move the piston to the target position according to the position of the piston based on the zero position of the piston.

The target position may be a position corresponding to half of the total displacement of the piston.

In the controlling, by the control unit, when it is determined that the brake pedal is pressed, a motor drive unit, the control unit may increase a motor control current supplied to the motor.

In the controlling, by the control unit, when it is determined that the brake pedal is pressed, a motor drive unit, the control unit may increase and modulate a position control proportional gain of the motor control current when the position of the piston is out of a preset allowable variation in piston position.

In the controlling, by the control unit, when it is determined that the brake pedal is pressed, a motor drive unit, the control unit may increase and modulate a position control proportional gain of the motor control current when the speed of rotation of the motor is out of a preset allowable variation in motor speed of rotation.

As apparent from the above description, the air bleeding apparatus and method for electric brake systems according to the embodiments of the present disclosure can prevent the collision of the piston in the air bleeding mode by controlling the motor to maintain the piston at a predetermined target position when entering the air bleeding mode.

DESCRIPTION

Figure 1:
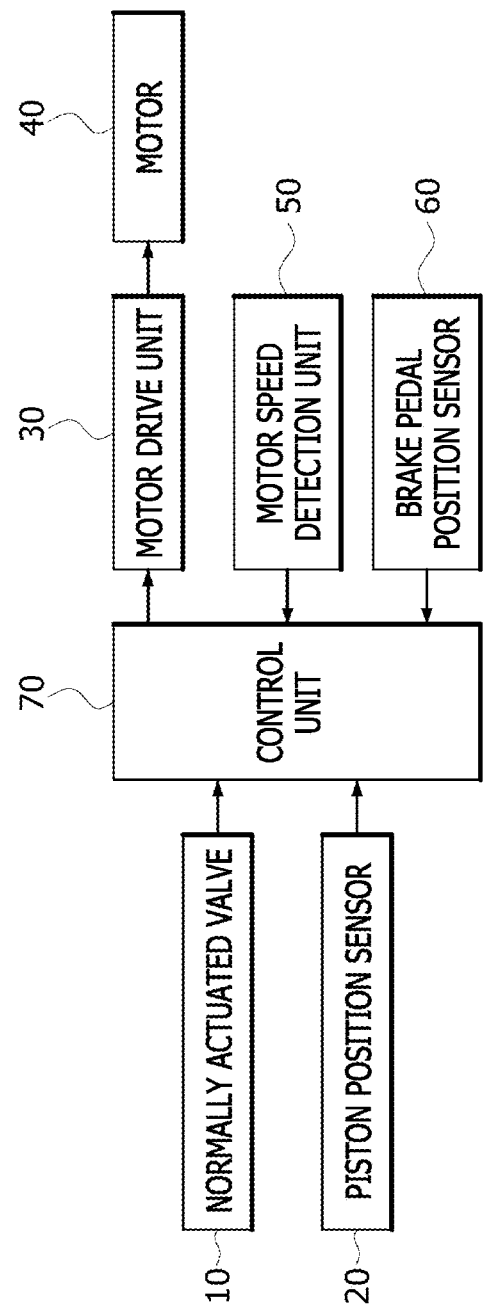
FIG. 1 is a block diagram illustrating an air bleeding apparatus for electric brake systems according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an air bleeding apparatus and method for electric brake systems will be described in detail with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the disclosure and may change depending on the intention or practice of a user or an operator. Therefore, these terms should be defined based on the overall disclosures set forth herein.

Figure 2:
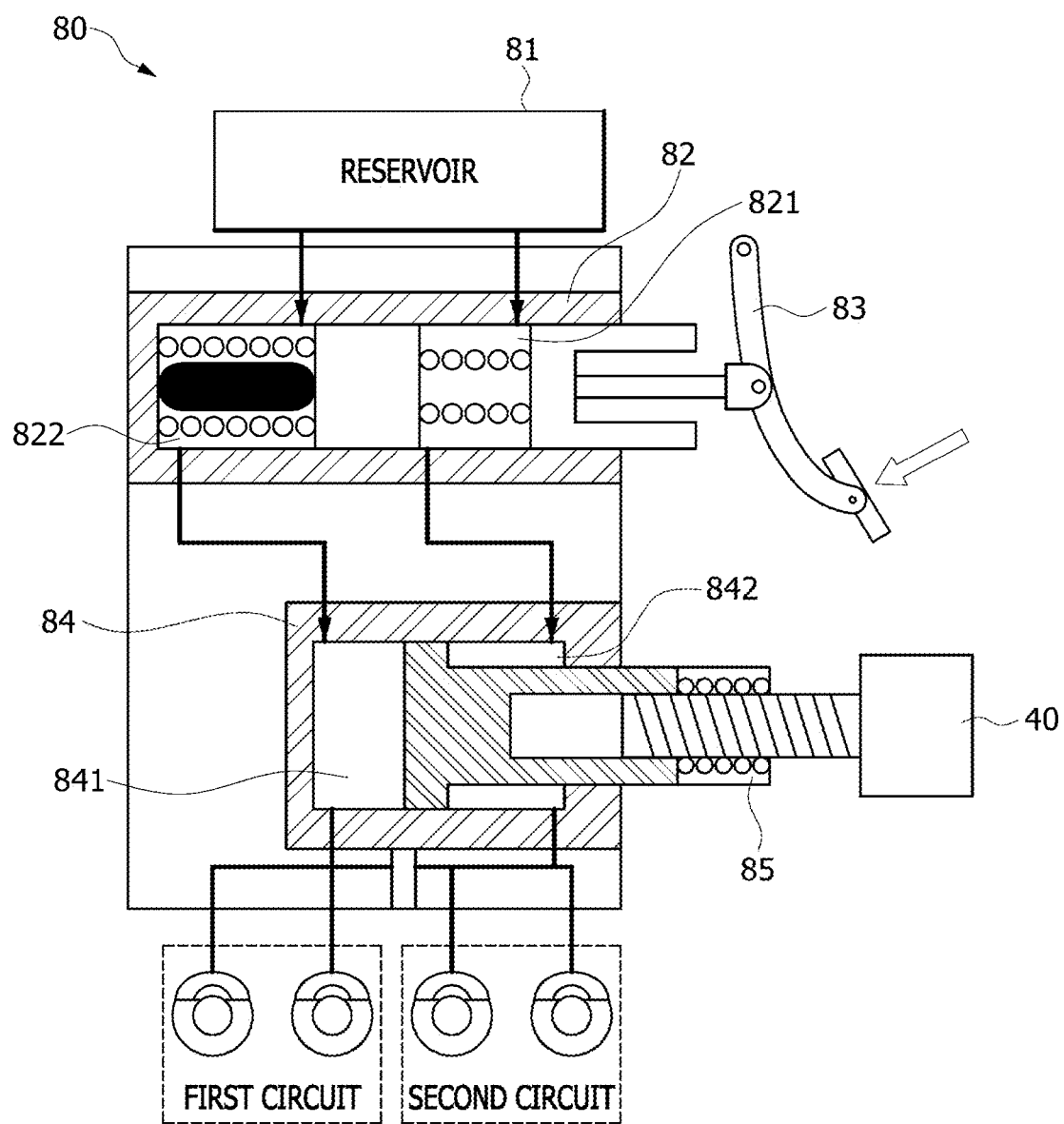
FIG. 2 is a schematic diagram illustrating an actuator for electric brake systems according to the embodiment of the present disclosure.
Figure 3:
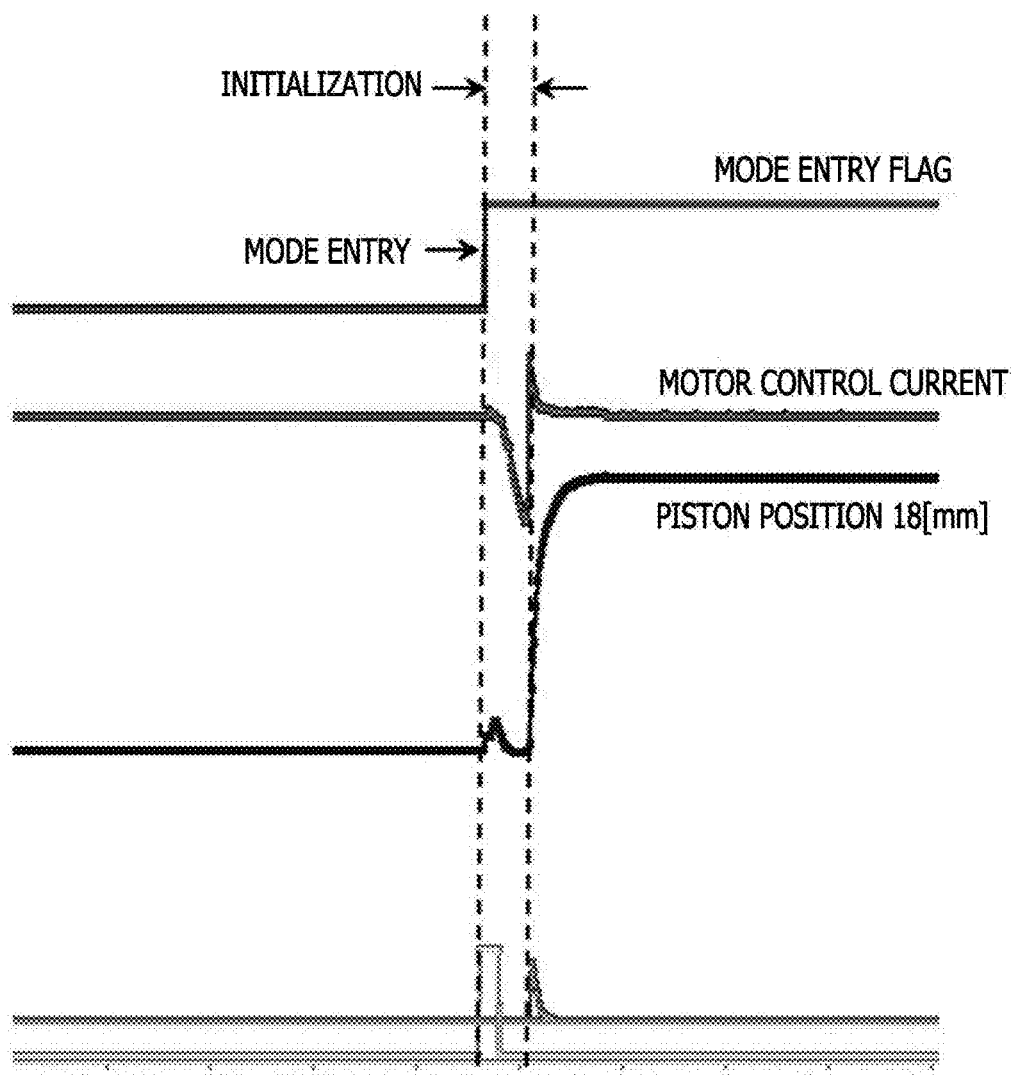
FIG. 3 is a diagram illustrating a piston position control method when entering an air bleeding mode according to the embodiment of the present disclosure.
Figure 4:
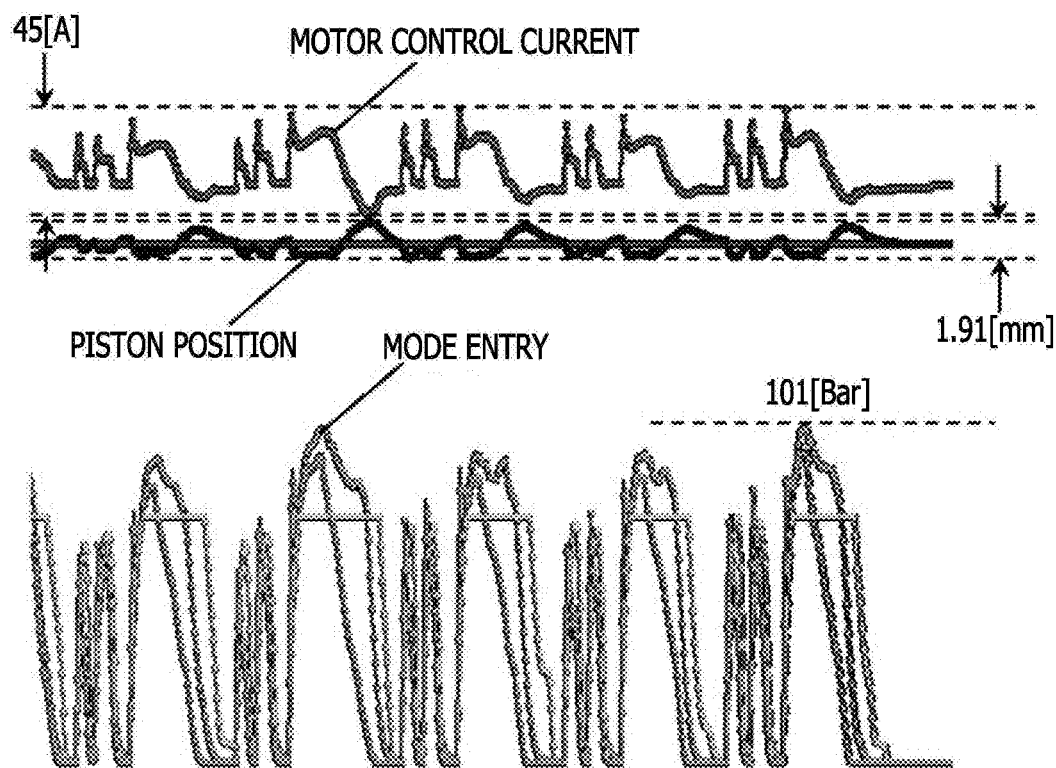
FIG. 4 is a diagram illustrating piston position control and maximum piston displacement when a pedal is repeatedly pressed according to the embodiment of the present disclosure.

FIG. 1 is a block diagram illustrating an air bleeding apparatus for electric brake systems according to an embodiment of the present disclosure. FIG. 2 is a schematic diagram illustrating an actuator for electric brake systems according to the embodiment of the present disclosure. FIG. 3 is a diagram illustrating a piston position control method when entering an air bleeding mode according to the embodiment of the present disclosure. FIG. 4 is a diagram illustrating piston position control and maximum piston displacement when a pedal is repeatedly pressed according to the embodiment of the present disclosure.

Referring to FIGS. 1 and 2, the air bleeding apparatus for electric brake systems according to the embodiment of the present disclosure includes a normally actuated valve 10, a piston position sensor 20, a motor drive unit 30, a motor 40, a motor speed detection unit 50, a brake pedal position sensor 60, a control unit 70 and an actuator 80.

Referring to FIG. 2, the actuator 80 generates a brake hydraulic pressure in an ESC integrated brake booster system, which is an electric brake system, and transmits the brake hydraulic pressure to a first circuit and a second circuit.

The first and second circuits are hydraulic circuits that are supplied with the brake hydraulic pressure from the actuator 80 of the electric brake system for braking wheels.

The actuator 80 includes a ball screw 85 that converts the rotational force of the motor 40 into a rectilinear motion, a main master cylinder 84 that has a piston structure for pressure generation, and an auxiliary master cylinder 82 that includes a pedal simulator simulating a brake pedal effort as in an existing brake system.

Reference numeral 81 is a reservoir tank.

When a user presses a brake pedal, a first chamber 822 and a second chamber 821 of the auxiliary master cylinder 82 are compressed and brake oil is transferred to the first and second circuits through a third chamber and a fourth chamber of the main master cylinder 84, respectively.

The first circuit and the second circuit include passages that connect wheel cylinders to the actuator 80 for supply of brake hydraulic pressure and a plurality of solenoid valves installed in the passages to control the brake hydraulic pressure supplied through the passages. By controlling the individual solenoid valves, the brake hydraulic pressure supplied to the wheel cylinders from the actuator 80 of the electric brake system may be controlled.

The first circuit controls the brake hydraulic pressure supplied from the actuator 80 to brake at least one wheel, and the second circuit controls the brake hydraulic pressure supplied from the actuator 80 to brake at least one other wheel.

For example, the wheels braked by the first circuit may be a left front wheel FL and a right rear wheel RR, and the wheels braked by the second circuit may be a right front wheel FR and a left rear wheel RL.

The normally actuated valve 10 is one of the solenoid valves provided in the first and second circuits, and is disposed upstream of the wheel cylinders to control the brake hydraulic pressure supplied to the wheel cylinders.

The piston position sensor 20 detects a position of a piston during linear reciprocation thereof to input the detected position to the control unit 70.

The brake pedal position sensor 60 detects a position of the brake pedal to input the detected position to the control unit 70.

The motor drive unit 30 drives the motor 40 by applying a motor control current to the motor 40. For example, the motor drive unit 30 may move the piston installed in the main master cylinder 84 in a straight direction by applying the motor control current to the motor 40 to drive the motor 40, thereby controlling the position of the piston. In particular, when entering an air bleeding mode, the motor drive unit 30 drives the motor 40 in response to the control signal of the control unit 70 to move the piston installed in the main master cylinder 84 to a predetermined target position.

The target position is a position corresponding to half of the total displacement of the piston installed in the main master cylinder 84. For example, when the total displacement of the piston is 34 mm, the target position may be set to 16 to 18 mm.

The motor speed detection unit 50 detects a motor speed of rotation when the motor 40 is rotated by the motor drive unit 30, and inputs the detected motor speed of rotation to the control unit 70.

The control unit 70 determines whether the brake pedal is pressed through the brake pedal position detected by the brake pedal position sensor 60 when entering the air bleeding mode. When it is determined that the brake pedal is pressed, the control unit 70 controls the motor drive unit 30 according to the piston position detected by the piston position sensor 20 or the motor speed of rotation detected by the motor speed detection unit 50, thereby controlling the position of the piston installed in the main master cylinder 84.

In more detail, the control unit 70 first enters the air bleeding mode when an air bleeding mode entry command is input thereto. The air bleeding mode entry command may be an operation command or diagnostic communication by a user, and may, in addition thereto, include a case where various conditions for entering the air bleeding mode are satisfied, and the like.

When entering the air bleeding mode, the control unit 70 checks a zero position (0 mm) of the piston.

Then, the control unit 70 controls the motor drive unit 30 according to the piston position based on the zero position of the piston to move the piston to the target position.

Maintaining the piston at the target position of the total displacement that the piston is movable while the air bleeding mode is performed may restrict the displacement that the piston moves even though there occurs a difference in pressure between the third chamber 841 and the fourth chamber 842 of the main master cylinder 84 due to the repeated pressing of the brake pedal during air bleeding in the second circuit. Therefore, it is possible to prevent the piston from colliding at a zero position (0 mm) or an opposite end position (about 34 mm).

To this end, when entering the air bleeding mode, the control unit 70 controls the piston to be at the zero position (0 mm) in advance as illustrated in FIG. 3. The reason is because the piston is highly unlikely to be at the zero position in the main master cylinder 84. Thus, the control unit 70 may prevent the malfunction of the piston by first checking the zero position of the piston before placing the piston at the target position in consideration of environments in which the piston is not at the zero position.

In addition, the control unit 70 releases the operation of the normally actuated valve 10, which is in an off state or an open state before the air bleeding mode, for securing the passage.

Then, when the user performs the air bleeding by repeatedly pressing the brake pedal, the control unit 70 checks whether the brake pedal is repeatedly pressed through the brake pedal position input from the brake pedal position sensor 60. In this case, the control unit 70 monitors the piston position and the motor speed of rotation detected by the respective piston position sensor 20 and motor speed detection unit 50 to variably control the position of the piston, installed in the main master cylinder 84, through the motor drive unit 30.

That is, as illustrated in FIG. 4, in the state in which the user performs the air bleeding by repeatedly pressing the brake pedal, the control unit 70 controls the motor drive unit 30 to increase the motor control current supplied to the motor 40, thereby enabling the piston installed in the main master cylinder 84 to be maintained at the target position.

To this end, the control unit 70 receives the piston position from the piston position sensor 20 in real time. In this state, if the piston position is out of a preset allowable variation in piston position, the control unit 70 controls the motor drive unit 30 by increasing and modulating the position control proportional gain of the motor control current, thereby allowing the motor control current to be increased.

Here, the allowable variation in piston position may be set based on the above target position.

If the motor speed of rotation is out of a preset allowable variation in motor speed of rotation, the control unit 70 increases and modulates the position control proportional gain of the motor control current, thereby allowing the motor control current to be increased.

As such, by controlling the motor 40 according to the piston position or the motor speed of rotation to restrain the position of the piston to the target position, it is possible to prevent the piston from colliding with both ends in the main master cylinder 84 by moving far away the target position (18 mm) by reason of a drop in the voltage of a 12V low-voltage battery, which is an in-vehicle supply voltage, an excessive chamber pressure deviation in the mechanism of the main master cylinder 84 (double pedal input or double braking to push brake oil more effectively through bleeding screws), or the like.

Figure 5:
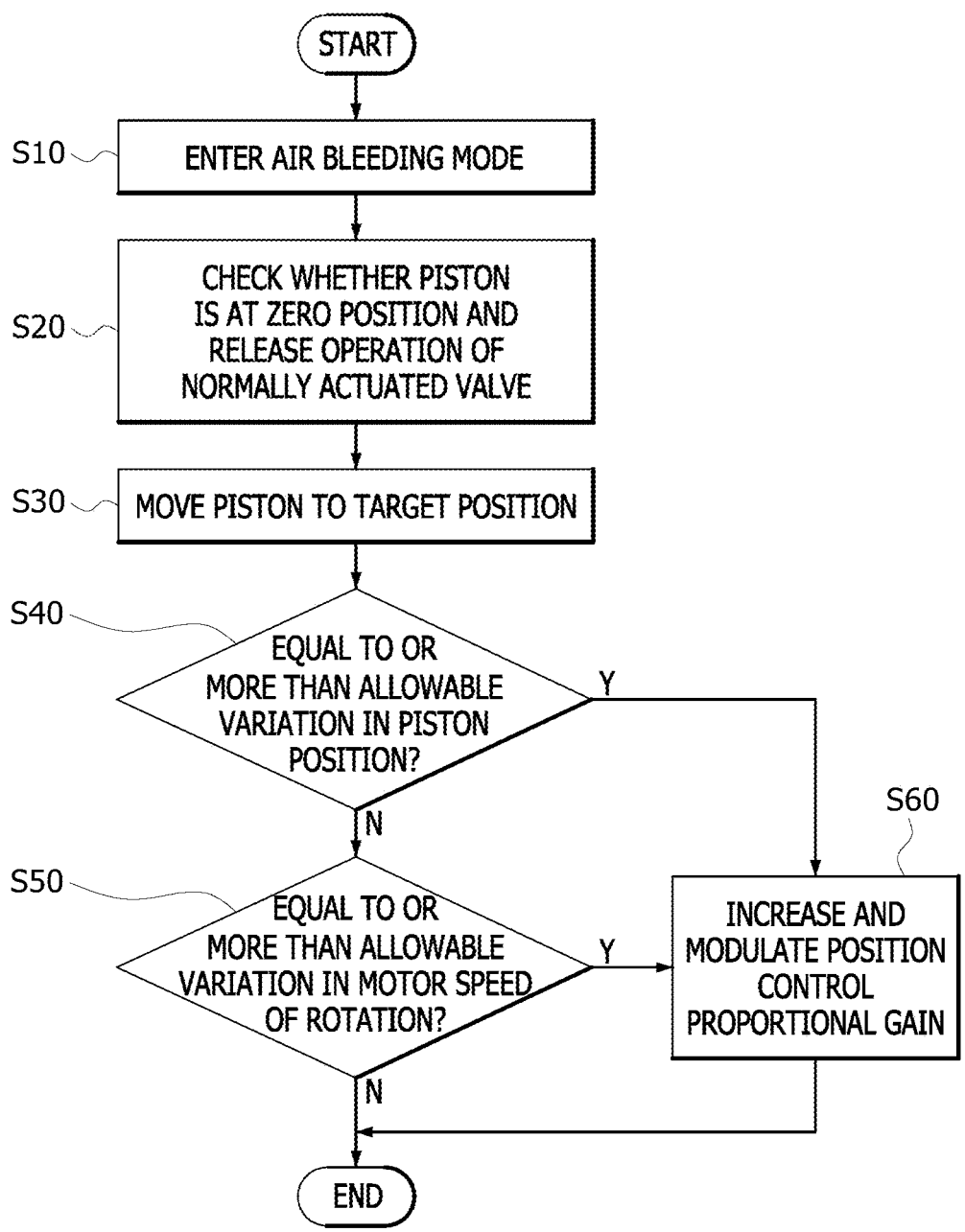
FIG. 5 is a flowchart illustrating an air bleeding method for electric brake systems according to an embodiment of the present disclosure.

FIG. 5 is a flowchart illustrating an air bleeding method for electric brake systems according to an embodiment of the present disclosure.

Referring to FIG. 5, a control unit 70 first enters an air bleeding mode when an air bleeding mode entry command is input thereto (S10).

When entering the air bleeding mode, the control unit 70 checks a zero position (0 mm) of a piston and releases the operation of a normally actuated valve 10, which is in an off state or an open state before the air bleeding mode, for securing a passage (S20).

Then, the control unit 70 places the piston at a target position of the total displacement that the piston is movable, based on the zero position (0 mm) of the piston (S30).

In the state in which the piston is placed at the target position, when a user performs air bleeding by repeatedly pressing a brake pedal, the control unit 70 checks that the brake pedal is repeatedly pressed through the brake pedal position input from a brake pedal position sensor 60. In this case, the control unit 70 receives the piston position from a piston position sensor 20 in real time to determine whether the piston position is out of an allowable variation in piston position (S40).

If the piston position is out of the allowable variation in piston position as a result of the determination in step S40, the control unit 70 controls a motor drive unit 30 by increasing and modulating the position control proportional gain of a motor control current (S60), thereby allowing the motor control current to be increased.

On the other hand, if the piston position is not out of the allowable variation in piston position as a result of the determination in step S40, the control unit 70 determines whether a motor speed of rotation is out of an allowable variation in motor speed of rotation (S50).

If the motor speed of rotation is out of the allowable variation in motor speed of rotation as a result of the determination in step S50, the control unit 70 increases and modulates the position control proportional gain of the motor control current, thereby allowing the motor control current to be increased.

As such, since the control unit 70 controls the motor 40 according to the piston position or the motor speed of rotation to restrain the position of the piston to the target position, it is possible to prevent the piston from colliding with both ends in a main master cylinder 84 by moving far away the target position (18 mm).

Here, the process of restraining the position of the piston to the target position by controlling the motor 40 according to the piston position or the motor speed of rotation is continuously performed while the air bleeding such as double pedal pressure or double braking is performed.

Therefore, the air bleeding apparatus and method for electric brake systems according to the embodiments of the present disclosure can prevent the collision of the piston in the air bleeding mode by controlling the motor 40 to maintain the piston at a predetermined target position when entering the air bleeding mode.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the disclosure should be defined by the appended claims.

What is claimed is:

1. An air bleeding apparatus for electric brake systems comprising:
a piston position sensor configured to detect a position of a piston installed in a main master cylinder;
a motor drive unit configured to drive a motor to move the piston;
a motor speed detection unit configured to detect a speed of rotation of the motor;
a brake pedal position sensor configured to detect a position of a brake pedal; and
a control unit configured to, when entering an air bleeding mode, release an operation of a normally actuated valve and control the position of the piston by controlling the motor drive unit according to the position of the piston detected by the piston position sensor or the speed of rotation of the motor detected by the motor speed detection unit when it is determined that the brake pedal is pressed through the position of the brake pedal detected by the brake pedal position sensor.

2. The air bleeding apparatus according to claim 1, wherein the control unit maintains the piston at a predetermined target position.

3. The air bleeding apparatus according to claim 2, wherein:
the normally actuated valve is disposed upstream of a wheel cylinder to control a brake hydraulic pressure supplied to the wheel cylinder; and
when entering the air bleeding mode, the control unit releases the normally actuated valve and checks a zero position of the piston to move the piston to the target position according to the position of the piston based on the zero position of the piston.

4. The air bleeding apparatus according to claim 2, wherein the target position is a position corresponding to half of the total displacement of the piston.

5. The air bleeding apparatus according to claim 1, wherein the control unit increases a motor control current supplied to the motor.

6. The air bleeding apparatus according to claim 5, wherein when the position of the piston is out of a preset allowable variation in piston position, the control unit increases and modulates a position control proportional gain of the motor control current.

7. The air bleeding apparatus according to claim 5, wherein when the speed of rotation of the motor is out of a preset allowable variation in motor speed of rotation, the control unit increases and modulates a position control proportional gain of the motor control current.

8. An air bleeding method for electric brake systems comprising:
determining, by a control unit, when entering an air bleeding mode, whether a brake pedal is pressed through a position of the brake pedal detected by a brake pedal position sensor; and
controlling, by the control unit, when it is determined that the brake pedal is pressed, a motor drive unit according to a position of a piston detected by a piston position sensor or a speed of rotation of a motor detected by a motor speed detection unit to control the position of the piston.

9. The air bleeding method according to claim 8, wherein in the controlling, by the control unit, when it is determined that the brake pedal is pressed, a motor drive unit, the control unit maintains the piston at a predetermined target position.

10. The air bleeding method according to claim 9, further comprising, when entering the air bleeding mode, the control unit releasing an operation of a normally actuated valve and checking a zero position of the piston to move the piston to the target position according to the position of the piston based on the zero position of the piston.

11. The air bleeding method according to claim 9, wherein the target position is a position corresponding to half of the total displacement of the piston.

12. The air bleeding method according to claim 8, wherein in the controlling, by the control unit, when it is determined that the brake pedal is pressed, a motor drive unit, the control unit increases a motor control current supplied to the motor.

13. The air bleeding method according to claim 12, wherein in the controlling, by the control unit, when it is determined that the brake pedal is pressed, a motor drive unit, the control unit increases and modulates a position control proportional gain of the motor control current when the position of the piston is out of a preset allowable variation in piston position.

14. The air bleeding method according to claim 12, wherein in the controlling, by the control unit, when it is determined that the brake pedal is pressed, a motor drive unit, the control unit increases and modulates a position control proportional gain of the motor control current when the speed of rotation of the motor is out of a preset allowable variation in motor speed of rotation.

* * * * *